US012129894B2

(12) United States Patent
Takase et al.

(10) Patent No.: US 12,129,894 B2
(45) Date of Patent: Oct. 29, 2024

(54) TOLERANCE RING

(71) Applicant: TOGO SEISAKUSYO CORPORATION, Aichi (JP)

(72) Inventors: Yasutoshi Takase, Aichi-ken (JP); Joji Murakami, Aichi-ken (JP)

(73) Assignee: TOGO SEISAKUSYO CORPORATION

( * ) Notice: Subject to any disclaimer, the term of this patent is extended or adjusted under 35 U.S.C. 154(b) by 800 days.

(21) Appl. No.: 17/296,503

(22) PCT Filed: Nov. 6, 2019

(86) PCT No.: PCT/JP2019/043396
§ 371 (c)(1),
(2) Date: May 24, 2021

(87) PCT Pub. No.: WO2020/116073
PCT Pub. Date: Jun. 11, 2020

(65) Prior Publication Data
US 2022/0034369 A1     Feb. 3, 2022

(30) Foreign Application Priority Data

Dec. 7, 2018   (JP) ................................. 2018-229958

(51) Int. Cl.
*F16D 1/08* (2006.01)
*F16D 7/02* (2006.01)

(52) U.S. Cl.
CPC ........... *F16D 1/0835* (2013.01); *F16D 7/021* (2013.01); *Y10T 403/7061* (2015.01)

(58) Field of Classification Search
CPC ...... F16D 7/021; F16D 1/0835; F16D 1/8029; Y10T 403/7047; Y10T 403/7061
See application file for complete search history.

(56) References Cited

U.S. PATENT DOCUMENTS 2,293,491 A  *  8/1942  Cox  .................... B21C 37/0826
                                                        29/523
3,768,845 A     10/1973 Gilliland
                    (Continued)

FOREIGN PATENT DOCUMENTS

CN    207034006 U      2/2018
DE    1 500 700    *   7/1969
            (Continued)

*Primary Examiner* — Michael P Ferguson
(74) *Attorney, Agent, or Firm* — Christensen, Fonder, Dardi & Herbert PLLC

(57) ABSTRACT

A tolerance ring includes a ring body formed of a strip plate material having a spring property and formed in a ring shape. The tolerance also has a plurality of protrusions. The protrusions are formed on the ring body and radially protrude from the ring body. An abutment joint portion is formed between a first end and a second end of the ring body in the circumferential direction. The tolerance ring includes an insertion restricting portion configured to restrict an entering amount of another tolerance ring in the axial direction being inserted into the abutment joint portion from the side of the first edge of the ring body. The insertion restricting portion is located in an area between a first axial end of the plurality of protrusions in the axial direction and the first edge, so as to restrict the entering amount of the other tolerance ring.

2 Claims, 10 Drawing Sheets

(56) References Cited

U.S. PATENT DOCUMENTS

| | | | |
|---|---|---|---|
| 7,850,389 B2 * | 12/2010 | Hanrahan | ............ F16D 1/0835 403/372 |
| 2010/0003076 A1 | 1/2010 | Slayne | |
| 2012/0087044 A1 | 4/2012 | Schmidt et al. | |

FOREIGN PATENT DOCUMENTS

| | | | |
|---|---|---|---|
| DE | 10 2016 114 980 | * | 2/2018 |
| GB | 1108648 | * | 4/1968 |
| JP | H11-34889 A | | 2/1999 |
| JP | 2011-526669 A | | 10/2011 |
| JP | 2015-120414 A | | 7/2015 |
| JP | 2017-159757 A | | 9/2017 |
| WO | WO 2008/021890 A2 | | 2/2008 |
| WO | WO 2010/001221 A1 | | 1/2010 |

* cited by examiner

TOLERANCE RING

CROSS-REFERENCE TO RELATED APPLICATIONS

The present application is a U.S. National Phase entry of, and claims priority to, PCT Application PCT/JP2019/043396, filed Nov. 6, 2019, which claims priority to Japanese Patent Application No. 2018-229958, filed Dec. 7, 2018, both of which are incorporated herein by reference in their entireties for all purposes.

BACKGROUND

The present invention relates to a tolerance ring. For example, the present invention relates to a tolerance ring arranged between a shaft member and an outer peripheral member that encloses the shaft member in the circumferential direction.

The tolerance ring described in Japanese Patent Laid-Open No. H11-34889 is arranged in a state of being press-fitted between a shaft member and an outer peripheral member that encloses the shaft member in the circumferential direction. The tolerance ring has a ring body in which a plate material having a spring property is formed in a ring shape. The tolerance ring also has a plurality of protrusions protruding radially from the ring body. An abutment joint portion is formed between both ends of the ring body in the circumferential direction. The abutment joint portion extends through the ring body both in the radial direction and also in the axial direction. The tolerance ring is elastically deformed when being press-fitted between the shaft member and the outer peripheral member. The deformation causes the abutment joint portion to be expanded in the circumferential direction. This allows the tolerance ring to be easily assembled between the shaft member and the outer peripheral member.

However, separate tolerance rings may become entangled with each other because of their abutment joint portions. For example, in the manufacturing process of the tolerance ring, one tolerance ring may enter the abutment joint portion of another tolerance ring from the axial direction or the radial direction. Specifically, this may occur when a plurality of tolerance rings are housed in a container while being surface-treated or transported. That is, one tolerance ring may enter the abutment joint portion of another tolerance ring while they are in this container. As a result, the tolerance rings may become connected with each other in a chain shape, may be entangled in a spiral shape, or may be placed in an inner/outer double tubular shape. Alternatively, one tolerance ring may be fitted in another tolerance ring in a cross shape. If a surface treatment, such as coating, is performed while the tolerance rings are entangled with each other, the surface treatment may not be sufficiently performed. Therefore, the entangled tolerance rings must be manually separated before performing such a treatment.

In the tolerance ring described in International Publication No. WO2010/001221, both ends of the ring body are physically joined by welding or the like, so that the abutment joint portion is closed. Therefore, the tolerance rings will not entangle with each other because of abutment joint portion is welded shut. However, the complicated work is necessary to weld both ends of the ring body. Further, it is difficult to assemble the tolerance ring between the shaft member and the outer peripheral member because the circumferential width of the abutment joint portion does not easily expand.

A tolerance ring described in Chinese Utility Model Publication No. 207034006 includes recessed portions and protruding portions alternately provided in the axial direction at both circumferential ends of the ring body. The protruding portions are received in the recessed portions formed at the other end. In other words, the abutment joint portion has a meandering shape. Therefore, another tolerance ring may be restricted from axially entering such a tolerance ring from the abutment joint portion. However, the protruding portions are wider at the peak ends, while the recessed portions are wider at the valley ends. Therefore, it is not easy to expand the circumferential width of the abutment joint portion of the ring body when the protruding portions and recessed portions are fitted to each other. Therefore, it is not easy to assemble the tolerance ring between the shaft member and the outer peripheral member.

The tolerance ring shown, for example in FIG. 5, of International Publication No. WO2008/021890 has a protruding portion at one end in the circumferential direction of the ring body and a recessed portion at the other end. The protruding portion protrudes in the circumferential direction from substantially the center of the first circumferential end of the ring body. The recessed portion is recessed in the circumferential direction from substantially the center of the second circumferential end of the ring body, into which the protruding portion is received. Therefore, the protruding portion and the recessed portion restrict entry of another tolerance ring through the abutment joint portion. However, with this tolerance ring, another tolerance ring may instead enter deeply. Therefore, it still is necessary to manually separate the entangled tolerance rings, for example, before performing a surface treatment.

Therefore, there is a conventional need for tolerance rings that do not require separation of entangled tolerance rings before surface treatment, while still being structured to be easily assembled to a shaft member or the like. For example, there has conventionally been a need for tolerance rings that can suppress the degree of entanglement between the tolerance rings by restricting the degree to which another tolerance ring may enter the abutment joint portion.

BRIEF SUMMARY

According to one aspect of the present disclosure, a tolerance ring includes a ring body and a plurality of protrusions. The ring body is formed in a ring shape from a strip plate material having a spring property. The protrusions are formed on the ring body and protrude radially from the ring body. An abutment joint portion is formed between the first end and the second end of the ring body in the circumferential direction. The ring body has an axial first edge and second edge. The tolerance ring has an insertion restricting portion that restricts an entering amount of another tolerance ring that is being inserted into the abutment joint portion from the side of the first edge and in the axial direction. The insertion restricting portion is located so as to restrict the entering amount of another tolerance ring to an area between an axial end on the side of the first edge of the plurality of axial protrusions and the first edge.

Therefore, the entangled amount of a tolerance ring with another tolerance ring may be reduced. As a result, even if the tolerance rings remain entangled with each other, post-processing, such as surface treatment, can be performed for the following reasons. The tolerance ring as a finished product is used while being fitted between a shaft member and an outer peripheral member. For example, the tolerance ring may slide relative to the shaft member as it rotates relative to the shaft member with respect to the outer peripheral member. At this moment, the surface pressure is concentrated around the axial end of the protrusion. Therefore, it is desirable to apply a surface treatment to the axial ends of the protrusions.

In view of this, according to the present aspect, an insertion restricting portion is configured to restrict another tolerance ring from being inserted beyond the axial end of the protrusions. The surface treatment can thus be applied around the axial end, even if the tolerance rings are entangled with each other. A post-processing should not be limited to a surface treatment, such as coating, shot-blasting, etc., and may also or instead include rust prevention treatment, heat treatment, or the like. In addition, since the entanglement amount of the tolerance rings is small, it is possible to separate a tolerance ring from another tolerance ring more easily.

According to one aspect of the present disclosure, an insertion restricting portion includes a first slit and a second slit. The first slit extends from a first edge of a ring body between a first end and a second end. The second slit extends from the first slit at an angle with respect to the first slit. A connection point between the first slit and the second slit is located on the side of the ring body in an area between the axial end of the first edge of a plurality of axial protrusions and the first edge.

Therefore, the ring body of the other tolerance ring that is axially entering along the first slit abuts the connection point between the first slit and the second slit. As a result, the entry of the other tolerance ring in the axially inward direction is restricted by the connection point. Thus, the degree of entanglement between the tolerance rings can be restricted. In addition, the connection point restricts that the periphery of the axial end of the protrusion from being covered by the other tolerance ring. Therefore, even if the tolerance rings remain entangled with each other, surface treatment around the axial ends of the protrusions can be performed.

According to one aspect of the present disclosure, the insertion restricting portion has a cutout that extends in the extending direction of the first slit from the first slit beyond the connection point between the first slit and the second slit. Therefore, the ring body of the other tolerance ring that is axially entering along the first slit enters from the first slit toward the cutout. This allows for the restriction of the entry of the tolerance ring from the first slit to the second slit. Thus, the degree of entanglement between the tolerance rings can be reliably restricted.

According to one aspect of the present disclosure, the first slit has a width greater than the plate thickness of the ring body. Therefore, it is possible to prevent the width of the abutment joint portion from being expanded by the other tolerance ring entering the first slit. Therefore, it is possible to prevent the other tolerance ring from being clamped by the elastic force of the ring body. As a result, the entangled tolerance rings can be easily separated.

According to one aspect of the present disclosure, the insertion restricting portion has a slit extending from the first edge of the ring body between the first end and the second end. The slit has a curved section that restrict the entering amount of the other tolerance ring in the axial direction. The curved section is located on a side of the ring body in an area between the axial end of the first edge of a plurality of axial protrusions and the first edge.

Therefore, the ring body of the other tolerance ring entering in the axial direction along the slit abuts a side wall of the curved section. The entry of the other tolerance ring in the axially inward direction may thus be restricted by the curved section. As a result, the degree of entanglement between the tolerance rings may be restricted. Further, the curved section may prevent the periphery of the axial end of the protrusion from being covered by the other tolerance ring. Therefore, even if the tolerance rings remain entangled with each other, surface treatment around the axial ends of the protrusions can be performed.

According to one aspect of the present disclosure, the insertion restricting portion includes protrusions protruding radially outward or radially inward from the ring body. The protrusions therefore restricts the other tolerance ring from entering the abutment joint portion in the radial direction. This makes it possible to more reliably restrict the tolerance rings from becoming entangled with each other.

DETAILED DESCRIPTION

First Embodiment

Figure 1:
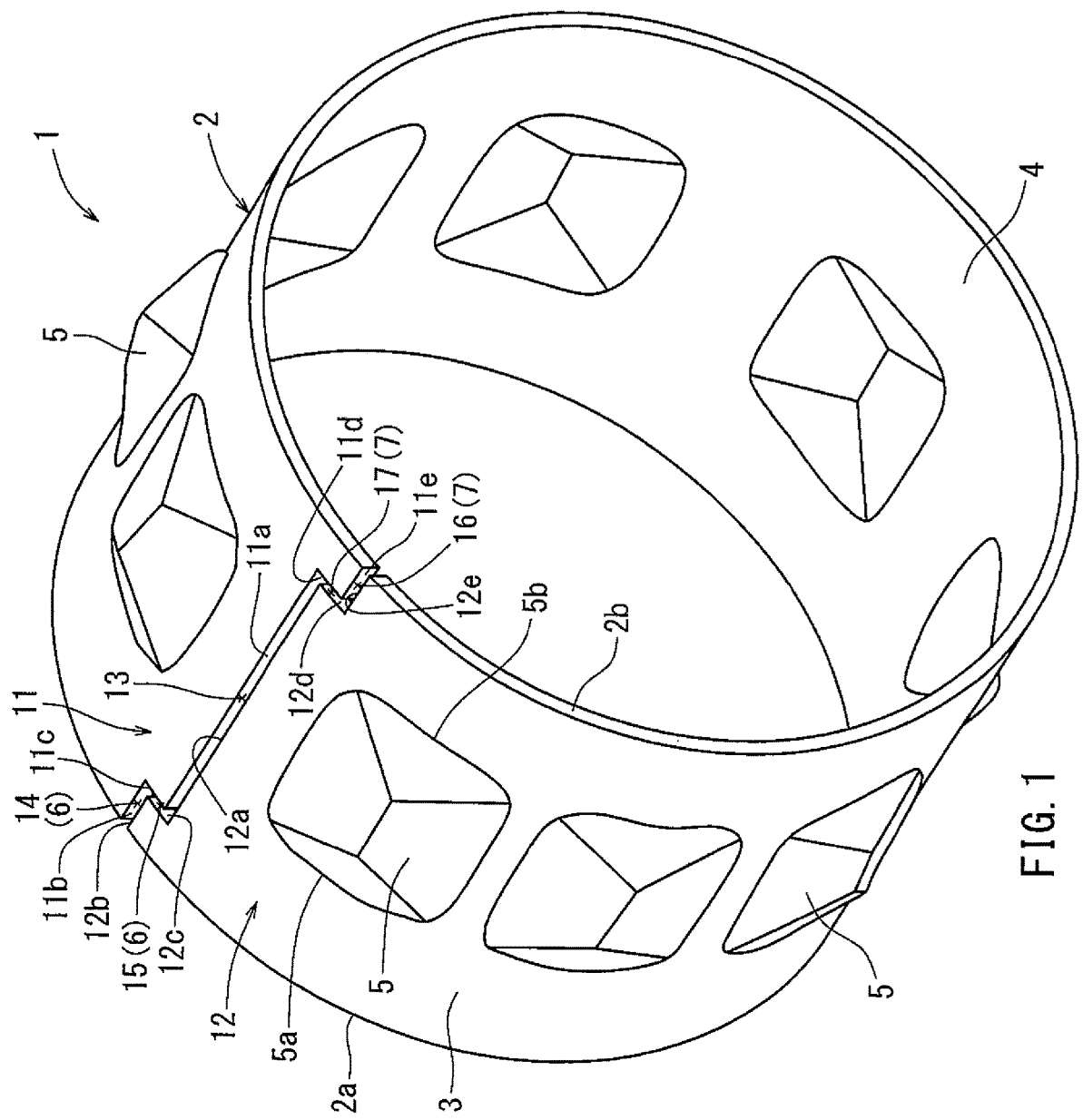
FIG. 1 is a perspective view of a tolerance ring according to a first embodiment.

A first embodiment will be described with reference to FIGS. 1 to 3. As shown in FIG. 1, a tolerance ring 1 includes a ring body 2, which may generally have a cylindrical shape, and a plurality of protrusions 5. The ring body 2 may be formed in a cylindrical shape by rolling a strip plate material having a spring property. The tolerance ring 1 may be made of a metallic material, such as iron or an alloy steel, such as high carbon steel or stainless steel, or a non-ferrous metal, such as copper or nickel or a metal alloy thereof.

The tolerance ring 1 shown in FIG. 1 is used by being fitted between a shaft member and an outer peripheral member. The shaft member may be, for example, a columnar or cylindrical metal member, such as a rotor shaft. The outer peripheral member has, for example, a cylindrical shape. The shaft member is inserted into the center hole of the outer peripheral member. Therefore, a cylindrical gap having a short radial length is formed between the shaft member and the outer peripheral member. The tolerance ring 1 is press-fitted into this cylindrical gap, so as to fit between both members. The outer peripheral surface 3 of the ring body 2 faces the inner peripheral surface of the outer peripheral member when in use. The inner peripheral surface 4 of the ring body 2 slides with respect to the outer peripheral surface of the shaft member when the allowable value determined by the maximum frictional force due to press fitting is exceeded.

Figure 2:
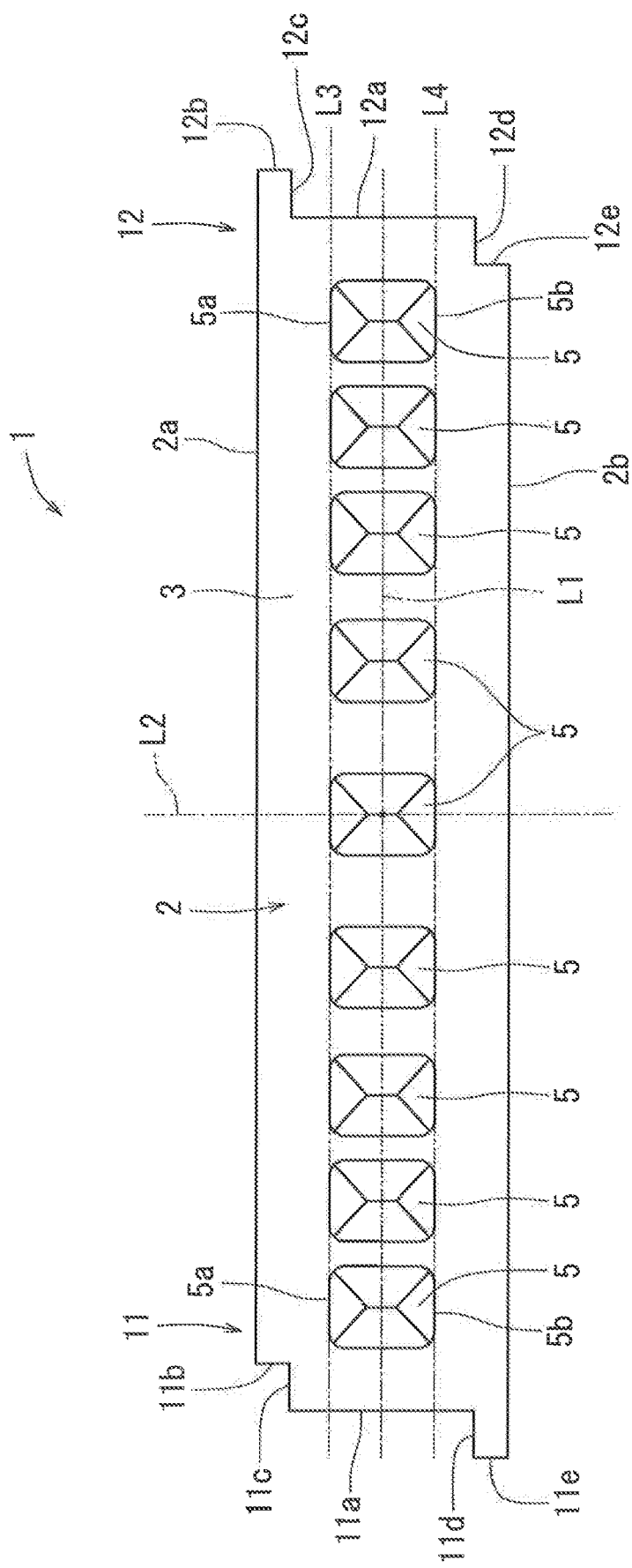
FIG. 2 is a developed view of the tolerance ring of FIG. 1.

As shown in FIGS. 1 and 2, the ring body 2 has a first end 11 at one end (left end in FIG. 2) in the circumferential direction. The ring body 2 has a second end 12 at the other end (right end in FIG. 2) in the circumferential direction. By allowing the first end 11 and the second end 12 to face each other, an abutment joint portion 13 is formed between the first end 11 and the second end 12. The abutment joint portion 13 extends through the ring body 2 in the radial direction. The abutment joint portion 13 separates the first end 11 and the second end 12 in the circumferential direction of the ring body 2. The ring body 2 has a first edge 2a at one end (upper end in FIG. 2) in the axial direction. The ring body 2 has a second edge 2b at the other end (lower end in FIG. 2) in the axial direction.

As shown in FIG. 2, a plurality of protrusions 5 are formed on the ring body 2; for example, nine protrusions 5 may be formed. The plurality of protrusions 5 are aligned in a row along the center line L1 of the ring body 2, the center line L1 extending in the circumferential direction (longitudinal direction) substantially at the center of the ring body 2 in the axial direction. The plurality of protrusions 5 also are arranged at predetermined spaces in the circumferential direction. For example, the space between the protrusions 5 located near end faces 11a, 12a of the first and second ends may be smaller than the space between the protrusions 5 located in the center. The plurality of protrusions 5 are arranged so that their longitudinal lines are orthogonal to the center line L1 and are arranged along the axial direction of the ring body 2. The center line L2 in FIG. 2 passes through the center of the expanded ring body 2 in the longitudinal direction and is orthogonal to the longitudinal direction. When the ring body 2 is formed in a ring shape, its center line L2 is located on a side of the radial direction opposite to the abutment joint portion 13 (see FIG. 1). Each protrusion 5 is line symmetric with respect to the center line L2 extending along the axial direction.

As shown in FIGS. 1 and 2, the protrusions 5 protrude radially outward from the ring body 2, have triangular slopes on both axial sides, and are formed to have a pent roof shape (hip roof, hipped roof) having trapezoidal slopes on both circumferential sides. Each protrusion 5 has a rectangular shape, having its long side in the axial direction of the ring body 2, as shown in the plan view of FIG. 2.

As shown in FIG. 2, each protrusion 5 has a first axial end 5a on the side of the protrusion 5 near the first edge 2a (upper side in FIG. 2) of the ring body 2. The first axial ends 5a of the plurality of protrusions 5 are aligned in a row along a virtual line L3 extending in the circumferential direction of the ring body 2. The area between the first edge 2a and the virtual line L3 is flat and smooth. Each protrusion 5 has a second axial end 5b on the side of the protrusion 5 near the second edge 2b (lower side in FIG. 2) of the ring body 2. The second axial ends 5b of the plurality of protrusions 5 are aligned in a row along a virtual line L4 extending in the circumferential direction of the ring body 2. The area between the second edge 2b and the virtual line L4 is flat and smooth.

Figure 3:
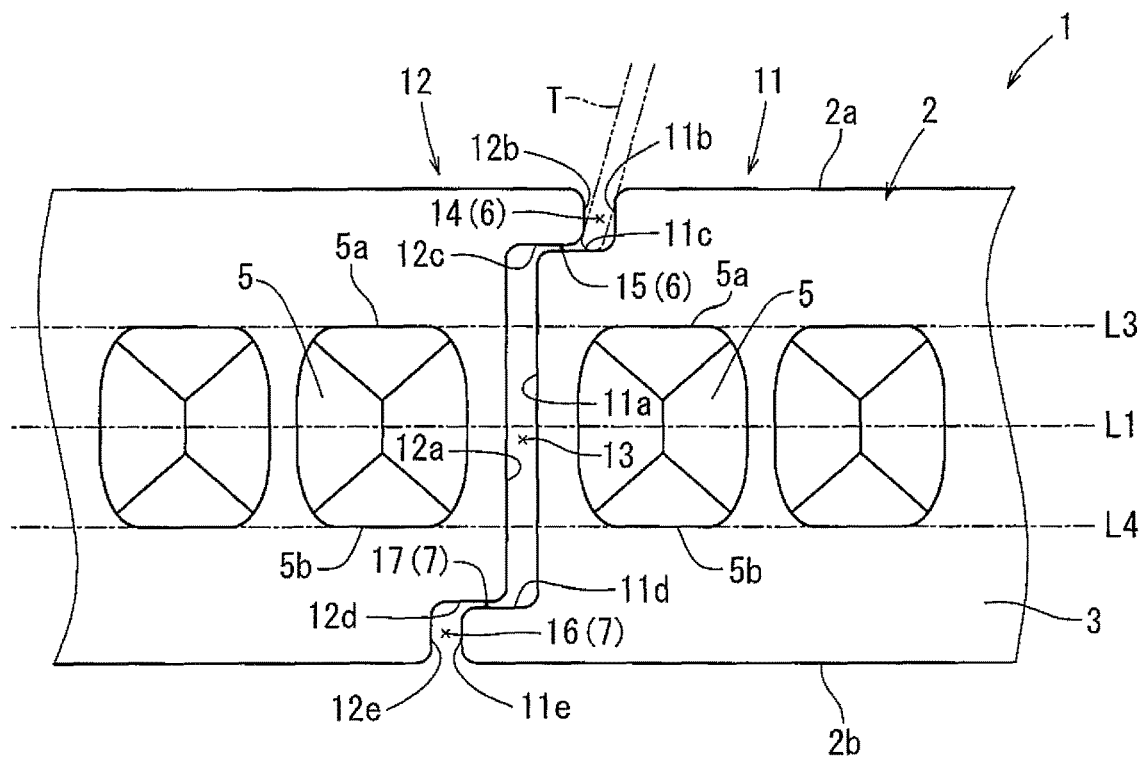
FIG. 3 is a plan view of the tolerance ring of FIG. 1 around an abutment joint portion.

As shown in FIG. 3, the first end 11 and the second end 12 have opposing end faces 11a, 12a at substantially the center of the ring body 2 in the axial direction. Insertion restricting portions 6, 7 are provided at both sides of the tolerance ring 1 in the axial direction, between the first end 11 and the second end 12. The insertion restricting portions 6, 7 are configured to restrict the degree to which another tolerance ring T enters the abutment joint portion 13. The insertion restricting portions 6, 7 restrict the degree of entry of another tolerance ring T in the axial direction of the ring body 2, as shown in the FIG. 3.

As shown in FIGS. 1 and 3, the end faces 11a and 12a of the first and second ends 11, 12 are long along the axial direction of the ring body 2 and have a thickness in the radial direction. The insertion restricting portion 6 is provided on the side of the first edge 2a (upper side in FIG. 3) of the end faces 11a, 12a in the axial direction. The insertion restricting portion 6 includes a first recessed wall surface 11b and a second recessed wall surface 11c formed on the first end 11. The second recessed wall surface 11c intersects the end face 11a at an angle and extends along the circumferential direction of the ring body 2. The first recessed wall surface 11b intersects the second recessed wall surface 11c at an angle and extends along the axial direction of the ring body 2 up to the first edge 2a. The first recessed wall surface 11b and the second recessed wall surface 11ic form a cutout shape that is cut out in a substantially rectangular shape in the circumferential direction (right side in FIG. 3).

As shown in FIG. 3, the insertion restricting portion 6 has a first projecting wall surface 12b and a second projecting wall surface 12c formed at the second end 12. The second projecting wall surface 12c forms an angle with the end face 12a of the second end 12 and extends along the circumferential direction of the ring body 2. The first projecting wall surface 12b forms an angle with the second projecting wall surface 12c and extends along the axial direction of the ring body 2, up to the first edge 2a. The first projecting wall surface 12b and the second projecting wall surface 12c form an overhanging shape, projecting in the circumferential direction (to the right in FIG. 3) in a substantially rectangular shape. The overhanging shape formed by the first projecting wall surface 12b and the second projecting wall surface 12c has a size and a shape that can be fitted in the cutout shape formed by the first recessed wall surface 11b and the second recessed wall surface 11c.

As shown in FIG. 3, the insertion restricting portion 6 has a first slit 14 between a first recessed wall surface 11b and a first projecting wall surface 12b. The first recessed wall surface 11b and the first projecting wall surface 12b may be substantially parallel to each other. The first slit 14 extends from the first edge 2a and along the axial direction of the ring body 2. The first slit 14 is formed to have a space wider than the plate thickness of the ring body 2. The insertion restricting portion 6 has a second slit 15 between a second recessed wall surface 11c and a second projecting wall surface 12c. The second recessed wall surface 11c and the second projecting wall surface 12c may be substantially parallel to each other. The second slit 15 intersects the first slit 14 at an angle (for example, about 90°). The second slit 15 extends from the first slit 14 and along the circumferential direction of the ring body 2. The second slit 15 is formed to have a narrower space than the plate thickness of the ring body 2. The first slit 14 and the second slit 15 are located between the first edge 2a and the virtual line L3.

When another tolerance ring T enters the abutment joint portion 13 in the axial direction, as shown in FIG. 3, the other tolerance ring T enters along the first slit 14. Therefore, the other tolerance ring T abuts and contacts the second recessed wall surface 11c. The contact with the second recessed wall surface 11c prevents the other tolerance ring T from entering the second slit 15.

As shown in FIG. 3, the insertion restricting portion 7 is provided on the side of the second edge 2b (lower side in FIG. 3) of the end faces 11a, 12a in the axial direction. The insertion restricting portion 7 is point-symmetric to the insertion restricting portion 6, with the center of the abutment joint portion 13 as the center of symmetry. That is, the insertion restricting portion 7 includes the first projecting wall surface 11e and the second projecting wall surface 11d formed at the first end 11. The first projecting wall surface 11e and the second projecting wall surface 11d form an overhanging shape projecting in a substantially rectangular shape in the circumferential direction (to the left side in FIG. 3). The insertion restricting portion 7 includes a first recessed wall surface 12e and a second recessed wall surface 12d formed at the second end 12. The first recessed wall surface 12e and the second recessed wall surface 12d form a cutout shape that is cut out in a substantially rectangular shape in the circumferential direction (left side in FIG. 3).

As shown in FIG. 3, the insertion restricting portion 7 includes a first slit 16 between the first projecting wall surface 11e and the first recessed wall surface 12e. The first projecting wall surface 11e and the first recessed wall surface 12e are substantially parallel to each other. The insertion restricting portion 7 includes a second slit 17 between the second projecting wall surface 11d and a second recessed wall surface 12d. The second projecting wall surface 11d and the second recessed wall surface 12d are substantially parallel to each other. The first slit 16 extends from the second edge 2b and along the axial direction of the ring body 2. The second slit 17 intersects the first slit 16 at an angle (for example, about 90°). The second slit 17 extends from the first slit 16 and along the circumferential direction of the ring body 2. The first slit 16 and the second slit 17 are provided between the second edge 2b and the virtual line L4. Even when the other tolerance ring T enters the first slit 16 in the axial direction, the other tolerance ring T abuts the second recessed wall surface 12d. Accordingly, the second recessed wall surface 12d prevents the other tolerance ring T from entering the second slit 17.

The tolerance ring 1 may be manufactured through various processes. For example, as shown in FIG. 2, a plurality of protrusions 5 are formed on the ring body 2 by press forming a strip plate material. Subsequently, the ring body 2 is formed in a ring shape. As a post-process, the tolerance ring 1 is surface-treated. The surface treatment may be, for example, heat treatment, shot blasting, coating, and/or rust prevention treatment. These treatments may be selectively performed in series.

In a conventional post-process step, the tolerance rings needed to be separated one by one, such that the post-process could be evenly performed on the necessary locations. For example, the tolerance rings may become entangled with each other due to the surface treatment or during transportation while a large number of the tolerance rings are stored in a container. Therefore, in the conventional post-process procedure, it was necessary to separate the entangled tolerance rings one by one before the post-process was performed. On the other hand, the tolerance ring 1 of the present embodiment has insertion restricting portions 6, 7 that serve to regulate the entering amount of the other tolerance ring T. Therefore, it is possible to perform a surface treatment on necessary locations of the tolerance ring 1, without first needing to separate any entangled tolerance rings 1.

As described above, the tolerance ring 1 includes a ring body 2 and a plurality of protrusions 5, as shown in FIGS. 1 and 3. The ring body 2 is formed in a ring shape from a strip plate material having a spring property. The protrusions 5 are formed on the ring body 2 and protrude radially outward from the ring body 2. An abutment joint portion 13 is formed between the first end 11 and the second end 12 of the ring body 2 in the circumferential direction.

The ring body 2 has a first edge 2a and a second edge 2b in the axial direction. The tolerance ring 1 has an insertion restricting portion 6 that serves to regulate the entering amount of another tolerance ring T into the abutment joint portion 13 in the axial direction from the first edge 2a side. The insertion restricting portion 6 is located so as to regulate the amount of axial entry of another tolerance ring T in the area between the first axial end 5a of the protrusion 5 and the first edge 2a of the ring body 2.

Further, as shown in FIG. 3, the tolerance ring 1 includes an insertion restricting portion 7 that serves to regulate the entering amount of another tolerance ring T in the axial direction into the abutment joint portion 13 from the side of the second edge 2b. The insertion restricting portion 7 is located so as to regulate the amount of axial entry of another tolerance ring T in the area between the second axial end 5b of the protrusion 5 and the second edge 2b.

Therefore, the degree of entanglement between the tolerance ring 1 and another tolerance ring T becomes smaller. Therefore, even if the tolerance rings remain entangled with each other, post-processes, such as surface treatment, can be performed. For example, when the tolerance ring 1 slides on the shaft member, the surface pressure on the tolerance ring 1 may be concentrated around the first axial end 5a and the second axial end 5b of the protrusion 5. Therefore, it may be desirable that the first axial end 5a and the second axial end 5b are surface-treated.

As shown in FIG. 3, the insertion restricting portion 6 is provided between the first edge 2a of the ring body 2 and the virtual line L3. Therefore, the insertion restricting portion 6 restricts the ring body of another tolerance ring T from being inserted beyond the virtual line L3, shown in in FIG. 3. The insertion restricting portion 7 is provided between the second edge 2b of the ring body 2 and the virtual line L4. Therefore, the insertion restricting portion 7 also restricts the ring body of another tolerance ring T from being inserted beyond the virtual line L4 in FIG. 3.

Thus, even if the tolerance rings remain entangled with each other, surface treatment or the like around the first axial end 5a and the second axial end 5b of the protrusion 5 can be performed. It should be noted that the surface treatment shall not be limited to only coating or shot blasting, but may also include, for example, rust prevention treatment, heat treatment, or the like. Moreover, since the amount of entanglement of the other tolerance ring T is small, the tolerance ring 1 and the other tolerance ring T can be easily separated when they are to be separated.

As shown in FIG. 3, the insertion restricting portion 6 includes a first slit 14 and a second slit 15. The first slit 14 extends from the first edge 2a, between the first end 11 and the second end 12. The second slit 15 intersects the first slit 14 at an angle and extends from the first slit 14. The intersection point between the first slit 14 and the second slit 15 is located in the area between the first axial end 5a of the protrusion 5 and the first edge 2a of the ring body 2 in the axial direction. The insertion restricting portion 7 has a first slit 16 and a second slit 17. The first slit 16 extends from the second edge 2b, between the first end 11 and the second end 12. The second slit 17 intersects the first slit 16 at an angle and extends from the first slit 16. The intersection point between the first slit 16 and the second slit 17 is located in the area between the second axial end 5b of the protrusion 5 and the second edge 2b of the ring body 2 in the axial direction.

Therefore, if another tolerance ring T enters the first slit 14 in the axial direction, it abuts the second recessed wall surface 11c at the intersection point between the first slit 14 and the second slit 15. As a result, further entry of another tolerance ring T in the axially inward direction is restricted by the second recessed wall surface 11c. If another tolerance ring T axially enters the first slit 14 in the axial direction, it abuts the second recessed wall surface 12d at the intersection point between the first slit 16 and the second slit 17. As a result, further entry of another tolerance ring T in the axially inward direction is restricted by the second recessed wall surface 12d.

The degree of entanglement between tolerance rings can thus be restricted. Moreover, it is restricted such that the peripheries of the first axial direction end 5a and the second axial direction end 5b of the protrusion 5 are not substantially covered by the other tolerance ring T, due to restricting the entry amount of the other tolerance ring T. Therefore, even if the tolerance rings remain entangled with each other, surface treatment can be performed around the first axial end 5a and the second axial end 5b of the protrusion 5.

As shown in FIG. 3, the first slits 14, 16 extend along the axial direction of the ring body 2. The second slits 15, 17 extend along the circumferential direction of the ring body 2. Both side surfaces of the first slits 14, 16 and both side surfaces of the second slits 15, 17 are substantially parallel to each other. Therefore, when the circumferential width of the abutment joint portion 13 is to be increased, the first end 11 and the second end 12 are unlikely to catch on each other. Therefore, the ring body 2 is easily deformed so as to widen the circumferential width of the abutment joint portion 13. Therefore, even if another tolerance ring T enters the first slits 14, 16, the tolerance rings can be easily separated from each other by widening the width of the abutment joint portion 13 in the circumferential direction. Further, since the spaces of the first slits 14, 16 are wider than the plate thickness of the ring body of the other tolerance ring T, the first slits 14, 16 do not easily hold onto the other tolerance ring T. Accordingly, even if the tolerance rings are entangled with each other, they may be spontaneously separated easily.

Second Embodiment

A second embodiment will be described with reference to FIG. 4. The tolerance ring 20 shown in FIG. 4 has a first end 21 and a second end 22, in place of the first end 11 and the second end 12 of the tolerance ring 1 shown in FIG. 3. The first end 21 and the second end 22 of the second embodiment have opposing end faces 21a, 22a in approximately the axial center of the ring body 2. Insertion restricting portions 28, 29 are provided on both sides of the ring body 2 in the axial direction between the first end 21 and the second end 22. The insertion restricting portions 28, 29 restrict the entry amount of another tolerance ring T into the abutment joint portion 23, for example, in the axial direction of the ring body 2, as shown in FIG. 4.

Figure 4:
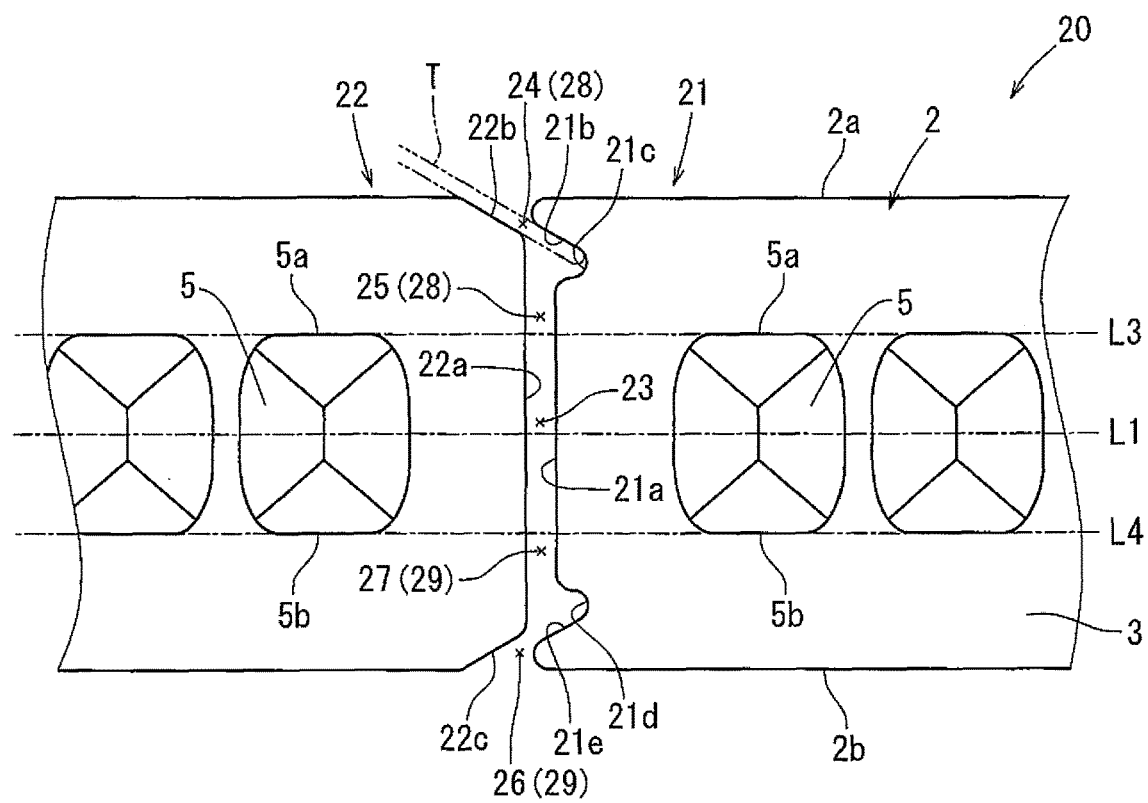
FIG. 4 is a plan view of the tolerance ring around the abutment joint portion according to a second embodiment.

As shown in FIG. 4, the insertion restricting portion 28 is provided on the side of the first edge 2a (upper side in FIG. 4) of the end faces 21a, 22a in the axial direction. The insertion restricting portion 28 includes a projecting surface 21b formed on the first end 21 and a cutout surface 22 b formed on the second end 22. The projecting surface 21b intersects the first edge 2a at an angle of, for example, 30 to 60°, and extends from left to right as it extends downward from upward as shown in the FIG. 4. The projecting surface 21b and the first edge 2a form a substantially triangular overhanging shape projecting from the end face 21a in the circumferential direction (left side in FIG. 4). The cutout surface 22b intersects the end face 22a and the first edge 2a, and extends substantially parallel to the projecting surface 21b.

As shown in FIG. 4, the insertion restricting portion 28 has a first slit 24 between the projecting surface 21b and the cutout surface 22b. The projecting surface 21b and the cutout surface 22b are substantially parallel to each other. The space of the first slit 24 is wider than the plate thickness of the ring body 2. The first slit 24 intersects the first edge 2a at an angle of, for example, 30 to 60°, and extends from the left to the right as it extends downward from upward. The insertion restricting portion 28 has a second slit 25 between the end faces 21a, 22a of the ring body 2. The end faces 21a, 22a of the ring body 2 are substantially parallel to each other. The second slit 25 intersects the first slit 24 at an angle (for example, 120 to 150°), and extends from the first slit 24 along the axial direction of the ring body 2.

As shown in FIG. 4, the first end 21 has a cutout 21c that is cut out in the extending direction of the first slit 24. The cutout 21c extends from a portion of the first slit 24 located beyond the connection of the first slit 24 and the second slit 25. The cutout 21c has a width that is substantially the same as the space of the first slit 24. The cutout 21c may have, for example, a substantially semicircular shape. The cutout 21c and the second slit 25 extend and branch from the first slit 24. The first slit 24, the cutout 21c, and the second slit 25 are located between the first edge 2a and the virtual line L3.

As shown in FIG. 4, the insertion restricting portion 29 is provided on the side of the ring body 2 near the second edge 2b (lower side in FIG. 4) and near the end faces 21a, 22a in the axial direction. The insertion restricting portion 29 is line-symmetric with the insertion restricting portion 28, with the center line L1 acting as the center of symmetry. That is, the insertion restricting portion 29 includes a projecting surface 21e formed at the first end 21 and a cutout surface 22c formed at the second end 22. The projecting surface 21e and the cutout surface 22c intersect the second edge 2b of the ring body 2 at an angle. The projecting surface 21e and the cutout surface 22c extend substantially parallel to each other from the left to the right, as they extend upward from downward, as shown in FIG. 4.

As shown in FIG. 4, the insertion restricting portion 29 has a first slit 26 between the projecting surface 21e and the cutout surface 22c. The space of the first slit 26 is wider than the plate thickness of the ring body 2. The insertion restricting portion 29 has a second slit 27 between the end faces 21a, 22a. The second slit 27 intersects the first slit 26 at an angle, and extends from the first slit 26 along the axial direction of the ring body 2. The first end 21 has a cutout 21d that is cut out in the extending direction of the first slit 26. The cutout 21d extends from a portion of the first slit 26 beyond the connection between the first slit 26 and the second slit 27. The cutout 21d has a width that is substantially the same as the space of the first slit 26. The cutout 21d and the second slit 27 extend and branch from the first slit 26. The cutout 21d may have, for example, a substantially semicircular shape. The first slit 26, the cutout 21d, and the second slit 27 are located between the second edge 2b of the ring body 2 and the virtual line L4.

As described above, the insertion restricting portions 28, 29 have the first slits 24, 26 and the second slits 25, 27, respectively, as shown in FIG. 4. Each of the first slits 24, 26 extends at an angle from the first edge 2a and the second edge 2b. Each of the second slits 25, 27 intersects the respective first slits 24, 26 at an angle, and each extends from the respective first slits 24, 26. The cutouts 21c, 21d extend from the first slits 24, 26 in the extending direction of the first slits 24, 26 at a position beyond the connection points of the first slits 24, 26 and the second slits 25, 27.

Therefore, when the ring body of another tolerance ring T axially enters the first slits 24, 26, it enters from the first slits 24, 26 and in a direction toward the cutouts 21c, 21d. Subsequently, another tolerance ring T abuts the cutouts 21c, 21d, such that the further entry thereof is restricted. Therefore, it is possible to prevent the other tolerance ring T from entering the second slits 25, 27 from the first slits 24, 26. Thus, the degree of entanglement between the tolerance rings can be reliably restricted.

As shown in FIG. 4, the first end 21 has cutouts 21c, 21d that are cut in the axially inward direction of the ring body 2. The rigidity of the first end 21 of the ring body 2 is thus small. Therefore, the ring body 2 is easily bent particularly at the first end 21, when the ring body 2 is being formed by bending it into a ring shape. As a result, the ring body 2 can be easily formed into a ring shape.

Figure 5:
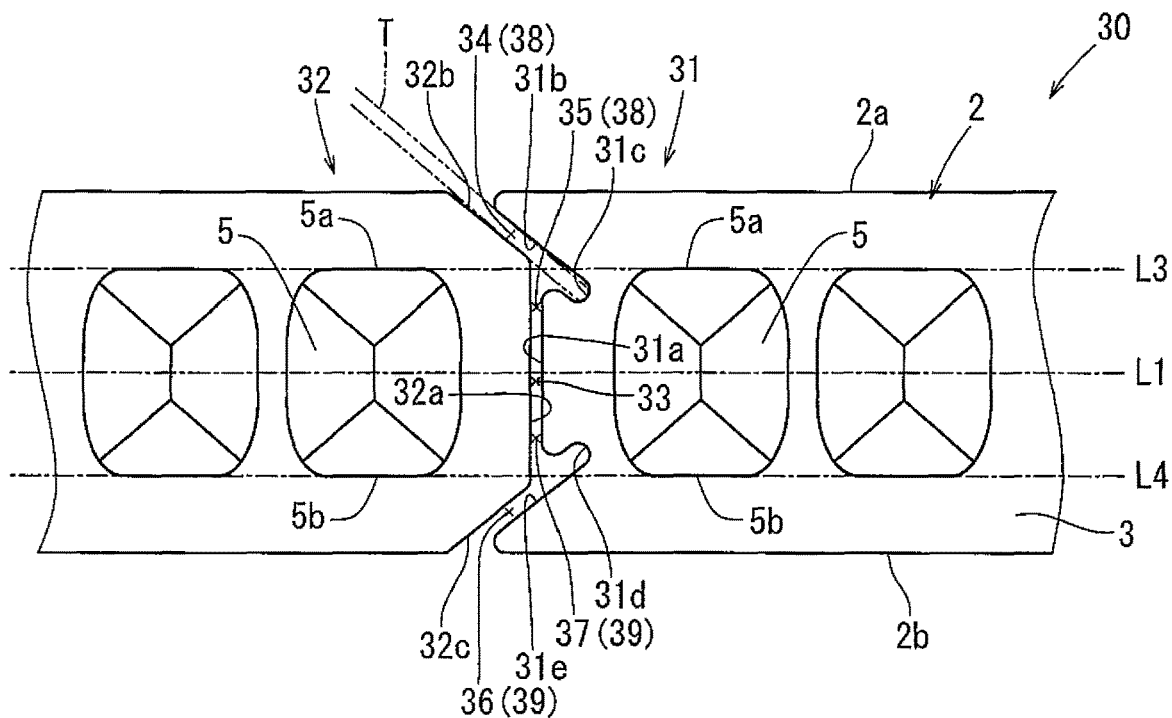
FIG. 5 is a plan view of the tolerance ring around the abutment joint portion of the first reference example.

The tolerance ring 30 of the first reference example shown in FIG. 5 has a first end 31, a second end 32, and insertion restricting portions 38, 39, instead of the first end 21, the second end 22, and the insertion restricting portions 28, 29 shown in FIG. 4. The first end 31 and the second end 32 shown in FIG. 5 have a configuration similar to that of the first end 21 and the second end 22, respectively, shown in FIG. 4. However, the insertion restricting portions 38, 39 of FIG. 5 have first slits 34, 36, second slits 35, 37, and cutouts 31c, 31d that are different than the insertion restricting portions 28, 29 shown in FIG. 4. In particular, they are different in that their branch points are located axially further inward than the virtual lines L3, L4 of the protrusions 5.

As shown in FIG. 5, the first end 31 has an end face 31a and projecting surfaces 31b, 31e similar to the end face 21a and projecting surfaces 21b, 21e shown in FIG. 4. As shown in FIG. 5, the second end 32 has an end face 32a and cutout surfaces 32b, 32c similar to the end face 22a and the cutout surfaces 22b, 22c shown in FIG. 4.

As described above, the insertion restricting portion 38 has a first slit 34, a second slit 35, and a cutout 31c, as shown in FIG. 5. The first slit 34 extends from the first edge 2a of the ring body 2 at an angle. The second slit 35 intersects the first slit 34 at an angle and extends from the first slit 34. The cutout 31c extends from the first slit 34 in the extending direction of the first slit 34. The cutout 31c extends from the first slit 34 from a portion beyond the connection point between the first slit 34 and the second slit 35.

Therefore, the ring body of another tolerance ring T may enter from the first slits 34, 36 and in an axial direction toward the cutouts 31c, 31d. However, upon further entry, the other tolerance ring T then abuts the cutouts 31c, 31d, thereby restriction the further entry therein. Accordingly, the other tolerance ring T can be prevented from entering the second slits 35, 37 from the first slits 34, 36. Thus, the degree of entanglement between the tolerance rings can be reliably restricted.

As shown in FIG. 5, the first end 31 has cutouts 31c, 31d that are cut in the axially inward direction of the ring body 2. Therefore, the rigidity of the first end 31 of the ring body 2 is small. Therefore, when the ring body 2 is being bent into a ring shape, it is easily bend, in particular at the first end 31. As a result, the ring body 2 can be easily formed into a ring shape.

Third Embodiment

A third embodiment will be described with reference to FIG. 6. The tolerance ring 40 shown in FIG. 6 has a first end 41, a second end 42, and insertion restricting portions 48, 49, instead of the first end 11, the second end 12, and the insertion restricting portions 6, 7 shown in FIG. 3. The insertion restricting portions 48, 49 may serve to restrict, for example, the degree to which another tolerance ring T enters an abutment joint portion 43, especially in the axial direction of the ring body 2 as shown in FIG. 6.

Figure 6:
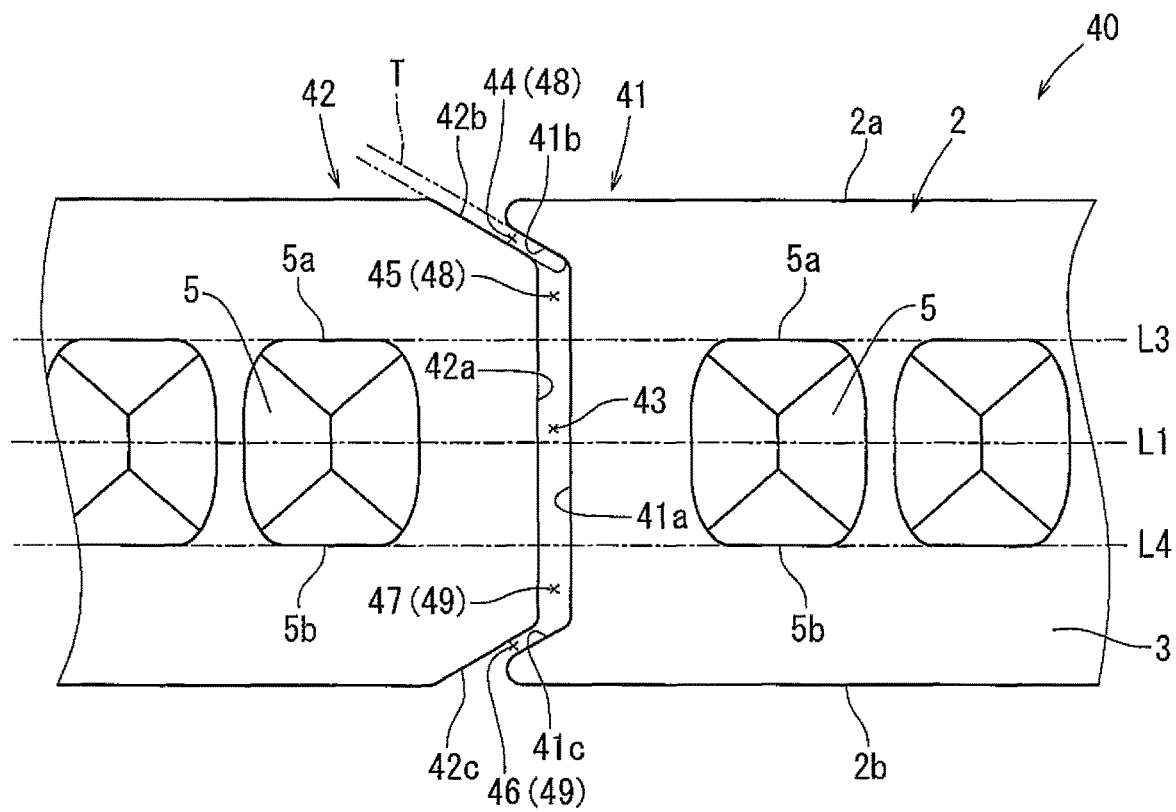
FIG. 6 is a plan view of the tolerance ring around the abutment joint portion according to a third embodiment.

As shown in FIG. 6, the insertion restricting portions 48, 49 have first slits 44, 46 and second slits 45, 47, similar to the insertion restricting portions 28, 29 shown in FIG. 4. However, a first end 41 of the ring body 2 shown in FIG. 6 does not have cutouts, in contrast to the cutouts 21c, 21d shown in FIG. 4. The first end 41 of the third embodiment has an end face 41a and projecting surfaces 41b, 41c, similar to the end face 21a and projecting surfaces 21b, 21e shown in FIG. 4. The projecting surfaces 41b, 41c shown in FIG. 6 intersect the end face 41a at an angle (for example, 120 to 150°). The second end 42 has an end face 42a and cutout surfaces 42b, 42c, similar to the end face 22a and the cutout surfaces 22b, 22c shown in FIG. 4.

As shown in FIG. 6, the first slits 44, 46 are formed between the projecting surfaces 41b, 41c and the cutout surfaces 42b, 42c that are substantially parallel to each other. The second slits 45, 47 are formed between the end faces 41a, 42a that are substantially parallel to each other. Both the first slits 44, 46 and the second slits 45, 47 are located between the first edge 2a, the second edge 2b, and the corresponding virtual lines L3, L4.

As described above, the insertion restricting portions 48, 49 have the first slits 44, 46 and the second slits 45, 47, respectively, as shown in FIG. 6. The first slits 44, 46 extend from the first edge 2a and the second edge 2b of the ring body 2 at an angle, respectively. The second slits 45, 47 intersect the first slits 44, 46 at an angle and extend from the first slits 44, 46, respectively.

Therefore, another tolerance ring T may enter in the axial direction along the first slit 44. However, the other tolerance ring T then abuts the upper end of the end face 41a in FIG. 6, which is the connection point between the first slit 44 and the second slit 45. Alternatively, the other tolerance ring T may axially enter along the first slit 46. However, the other tolerance ring T then abuts the lower end of the end face 41a in FIG. 6, which is the connection point between the first slit 46 and the second slit 47. Therefore, the end face 41a can restrict the entry of the other tolerance ring T into the second slits 45, 47.

Fourth Embodiment

Figure 7:
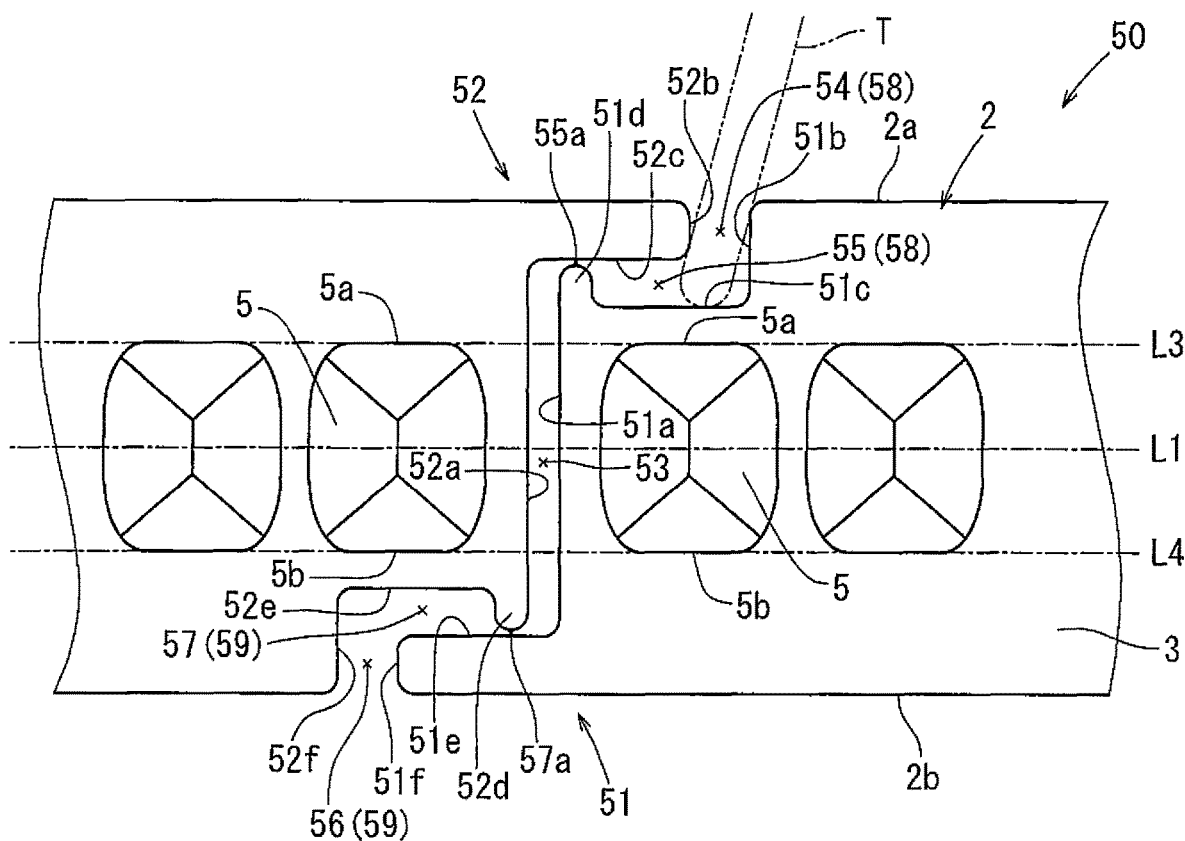
FIG. 7 is a plan view of the tolerance ring around the abutment joint portion according to a fourth embodiment.

A fourth embodiment will be described with reference to FIG. 7. The tolerance ring 50 shown in FIG. 7 has a first end 51 and a second end 52, similar to the first end 11 and the second end 12 shown in FIG. 3. The tolerance ring 50 shown in FIG. 7 has insertion restricting portions 58, 59, instead of the insertion restricting portions 6, 7 shown in FIG. 3. The tolerance ring 50 shown in FIG. 7 differs from the tolerance ring 1 shown in FIG. 3 in that it has axial protrusions 51d, 52*d*. As shown in FIG. 7, the first end 51 has an end face 51*a*, a first recessed wall surface 51*b*, a second recessed wall surface 51*c*, a first projecting wall surface 51*f*, and a second projecting wall surface 51*e*, which respectively have a configuration similar to the end face 11*a*, the first recessed wall surface 11*b*, the second recessed wall surface 11*c*, the first projecting wall surface 11*e*, and the second projecting wall surface 11*d* shown in FIG. 3. As shown in FIG. 7, the second end 52 has an end face 52*a*, a first projecting wall surface 52*b*, a second projecting wall surface 52*c*, a first recessed wall surface 52*f*, and a second recessed wall surface 52*e*, which respectively have a configuration similar to the end face 12*a*, the first projecting wall surface 12*b*, the second projecting wall surface 12*c*, the first recessed wall surface 12*e*, and the second recessed wall surface 12*d* shown in FIG. 3.

As shown in FIG. 7, the insertion restricting portion 58 has a first slit 54 between the first recessed wall surface 51*b* and a first projecting wall surface 52*b*, which are substantially parallel to each other. The first slit 54 extends from the first edge 2*a* of the ring body 2 and along the axial direction of the ring body 2. The first slit 54 extends at an angle to the first edge 2*a*. The first slit 54 is formed so as to have a width wider than the plate thickness of the ring body 2. The first slit 54 may have a space larger than that of the first slit 14 shown in FIG. 3. The insertion restricting portion 58 shown in FIG. 7 has a second slit 55 between the second recessed wall surface 51*c* and the second projecting wall surface 52*c*, which are substantially parallel to each other. The second slit 55 intersects the first slit 54 at an angle (for example, about 90°). The second slit 55 extends from the first slit 54 along the circumferential direction of the ring body 2. The second slit 55 may be narrower than the first slit 54.

As shown in FIG. 7, the axial protrusion 51*d* is located at a connection point between the end face 51*a* and the second recessed wall surface 51*c*. The axial protrusion 51*d* projects in a direction axially outward (upper side in FIG. 7) of the ring body 2 from the second recessed wall surface 51*c*. The axial protrusion 51*d* faces the second projecting wall surface 52*c*. The axial protrusion 51*d* defines a second narrow slit part 55*a* having a space narrower than the plate thickness of the ring body 2 between the axial protrusion 51*d* and the second projecting wall surface 52*c*. The first slit 54, the second slit 55, and the second narrow slit part 55*a* are located between the first edge 2*a* of the ring body 2 and the virtual line L3 of the protrusion 5.

As shown in FIG. 7, the insertion restricting portion 59 is point-symmetric to the insertion restricting portion 58, with the center of the abutment joint portion 53 acting as the center of symmetry. The insertion restricting portion 59 has a first slit 56 formed between the first projecting wall surface 51*f* and the first recessed wall surface 52*f*. The insertion restricting portion 59 also has a second slit 57 formed between the second projecting wall surface 51*e* and the second recessed wall surface 52*e*, similar to the other insertion restricting portion 58. The insertion restricting portion 59 has an axial protrusion 52*d*, similar to the axial protrusion 51*d*, and has a second narrow slit part 57*a* between the axial protrusion 52*d* and the second projecting wall surface 51*e*. The first slit 56, the second slit 57, and the second narrow slit part 57*a* are provided between the second edge 2*b* of the ring body 2 and the virtual line L4 of the protrusion 5.

As described above and as shown in FIG. 7, the first slits 54, 56 have a width larger than the plate thickness of the ring body of another tolerance ring T. Therefore, even if the other tolerance ring T enters the first slits 54, 56, it is hardly caught and easily separates naturally.

Fifth Embodiment

A fifth embodiment will be described with reference to FIGS. 8 to 10. The tolerance ring 60 shown in FIG. 9 has a first end 61, a second end 62, and insertion restricting portions 68, 69, instead of the first end 11, the second end 12, and the insertion restricting portions 6, 7 shown in FIG. 3. The tolerance ring 60 of FIGS. 8 to 10 differs from the tolerance ring 1 shown in FIG. 3 in that it has protrusions 61*f*, 62*f*. The first end 61 of the ring body 2 has an end face 61*a*, a first recessed wall surface 61*b*, a second recessed wall surface 61*c*, and a second projecting wall surface 61*d*, which respectively have a configuration similar to the end face 11*a*, the first recessed wall surface 11*b*, and the second recessed wall surface 11*c*, and the second projecting wall surface 11*d* shown in FIG. 3. The second end 62 of the ring body 2 includes an end face 62*a*, a first projecting wall surface 62*b*, a second projecting wall surface 62*c*, and a second recessed wall surface 62*d*, which respectively have a configuration similar to that of the end face 12*a*, the first projecting wall surface 12*b*, the second projecting wall surface 12*c*, and the second recessed wall surface 12*d* shown in FIG. 3.

Figure 8:
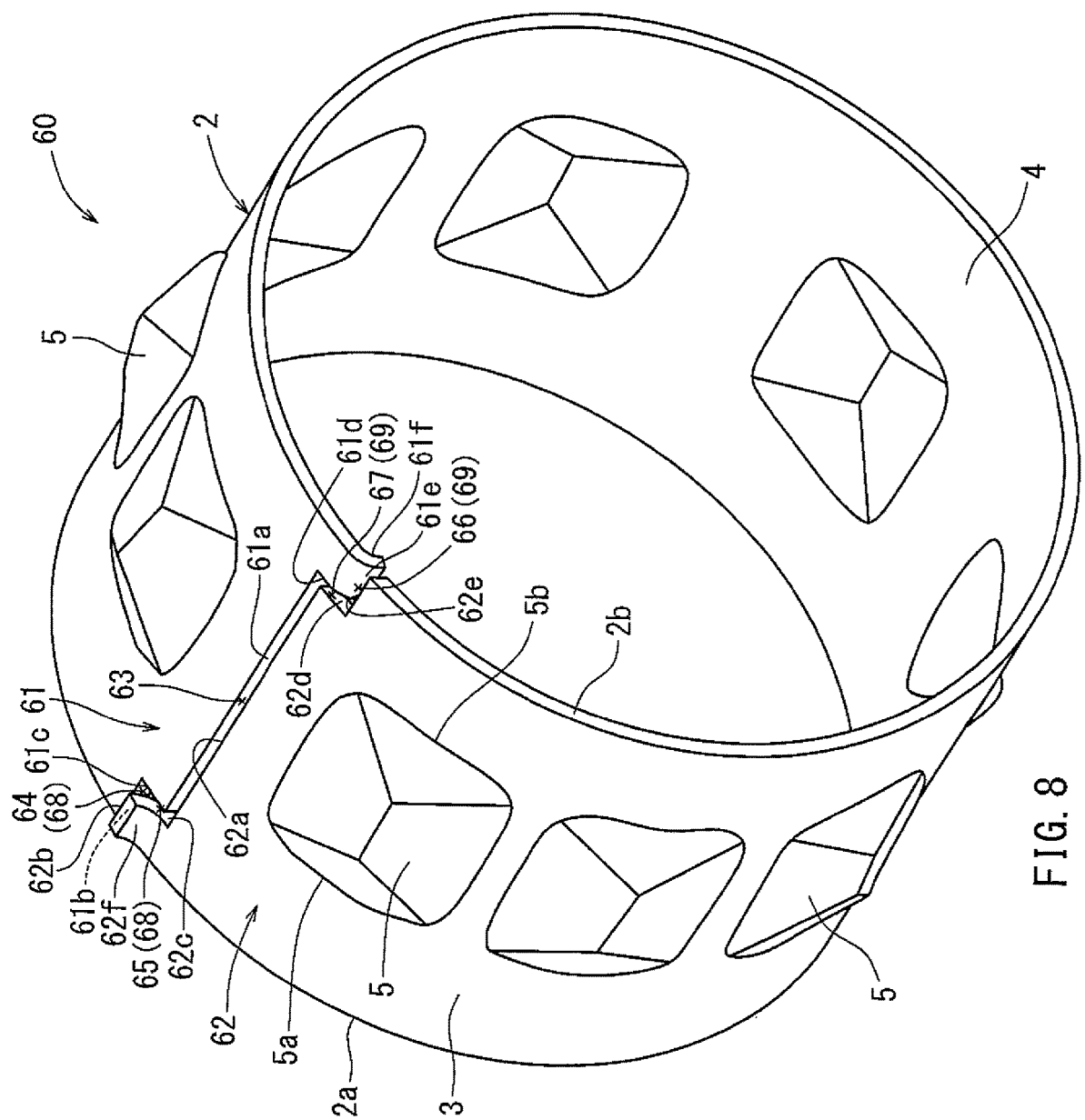
FIG. 8 is a perspective view of the tolerance ring according to a fifth embodiment.
Figure 9:
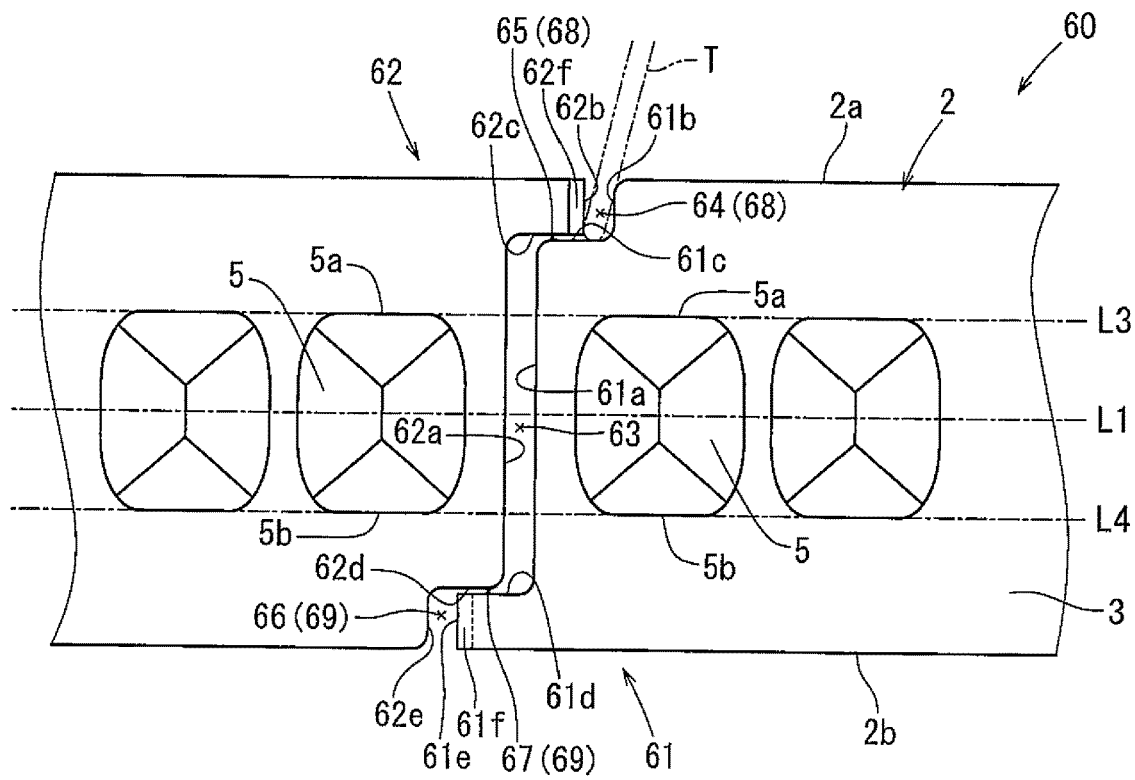
FIG. 9 is a plan view of the tolerance ring around the abutment joint portion of FIG. 8.

As shown in FIGS. 8 and 9, the protrusion 61*f* projects from the first end 61 along the second edge 2*b* in the circumferential direction (to the left in FIG. 9) in FIG. 9. A first projecting wall surface 61*e* that is curved inward in the radial direction from the top end of the protrusion 61*f* is formed at the top end of the protrusion 61*f*. The protrusion 61*f* has a substantially rectangular shape and has a second edge 2*b*, a first projecting wall surface 61*e*, and a second projecting wall surface 61*d* as end faces. The first projecting wall surface 61*e* is located at a circumferential top end of the protrusion 61*f*, and is oriented toward the circumferential direction. The first projecting wall surface 61*e* intersects the second projecting wall surface 61*d* at an angle. The first projecting surface 61*e* extends along the axial direction of the ring body 2 up to the second edge 2*b* of the ring body 2. The protrusion 61*f* is accommodated in the cutout formed at the second end 62. The cutout is defined by a first recessed wall surface 62*e* and a second recessed wall surface 62*d*.

As shown in FIGS. 8 and 9, the protrusion 62*f* is formed along the first edge 2*a* and has a configuration similar to the protrusion 61*f*. However, a first projecting wall surface 62*b* is curved radially outward from the top end of the protrusion 62*f*. The first projecting wall surface 62B is formed at the top end of the protrusion 62*f*. The protrusion 62*f* is substantially rectangular and has a portion of the first edge 2*a* of the ring body 2, a first projecting wall surface 62*b*, and a second projecting wall surface 62*c*. The protrusion 62*f* is received in a cutout formed in the first end 61. The cutout is defined by a first recessed wall surface 61*b* and a second recessed wall surface 61*c*.

As shown in FIG. 9, the insertion restricting portions 68, 69 have the first slits 64, 66 and the second slits 65, 67, similar to the insertion restricting portions 6, 7 shown in FIG. 3. As shown in FIG. 9, the first slits 64, 66 are respectively formed between the first recessed wall surfaces 61*b*, 62*e* and the first projecting wall surfaces 62*b*, 61*e* that are substantially parallel to each other. Each of the second slits 65, 67 is formed between the second recessed wall surfaces 61*c*, 62*d* and the second projecting wall surfaces 62*c*, 61*d* that are substantially parallel to each other. The first slit 64, the second slit 65, and the protrusion 62*f* are located between the first edge 2*a* of the ring body 2 and the virtual line L3 of the protrusion 5. The first slit 66, the second slit 67, and the protrusion 61f are located between the second edge 2b of the ring body 2 and the virtual line L4 of the protrusion 5.

As described above, the insertion restricting portions 68, 69 have the first slits 64, 66 and the second slits 65, 67, respectively, as shown in FIG. 9. The first slits 64, 66 and the second slits 65, 67 restrict the degree of entry of another tolerance ring T into the abutment joint portion 63 in the axial direction, similar to the first slits 14, 16 and the second slits 15, 17 of FIG. 3.

Figure 10:
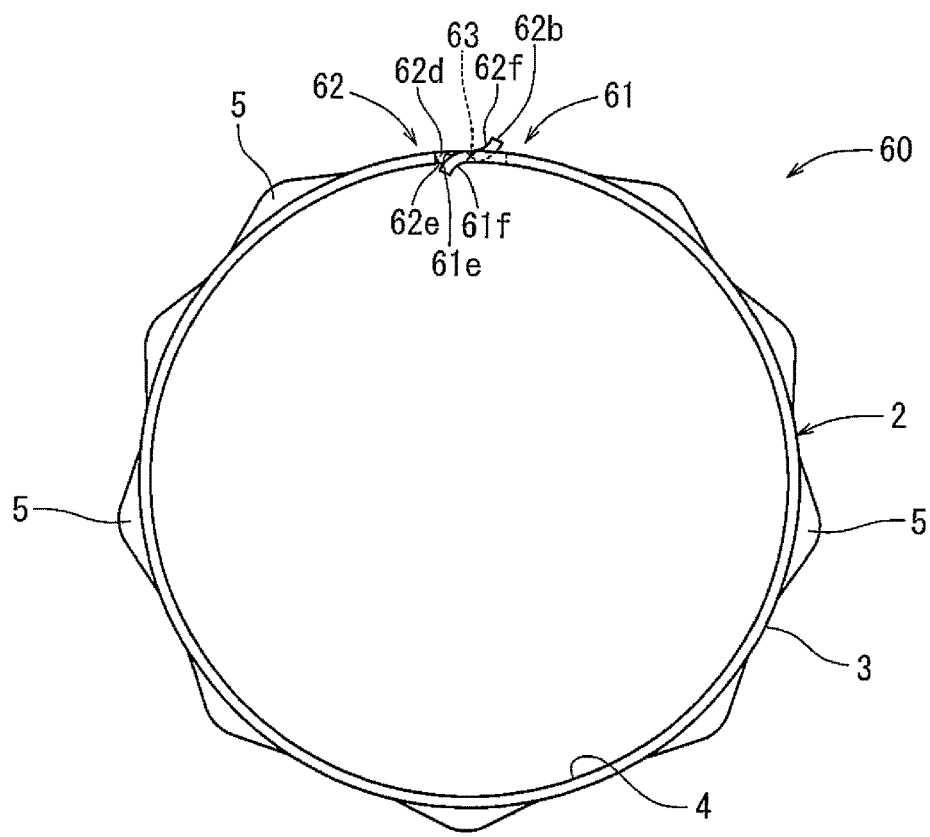
FIG. 10 is a front view of the tolerance ring of FIG. 8 as viewed in an axial direction.

As shown in FIGS. 8, 10, the insertion restricting portion 68 has a protrusion 62f protruding radially outward from the ring body 2. The insertion restricting portion 69 has a protrusion 61f that protrudes radially inward from the ring body 2. Therefore, the protrusions 61f, 62f prevent the other tolerance ring T (see FIG. 9) from entering the abutment joint portion 63 in the radial direction. This makes it possible to more reliably restrict the tolerance rings from becoming entangled with each other.

Figure 11:
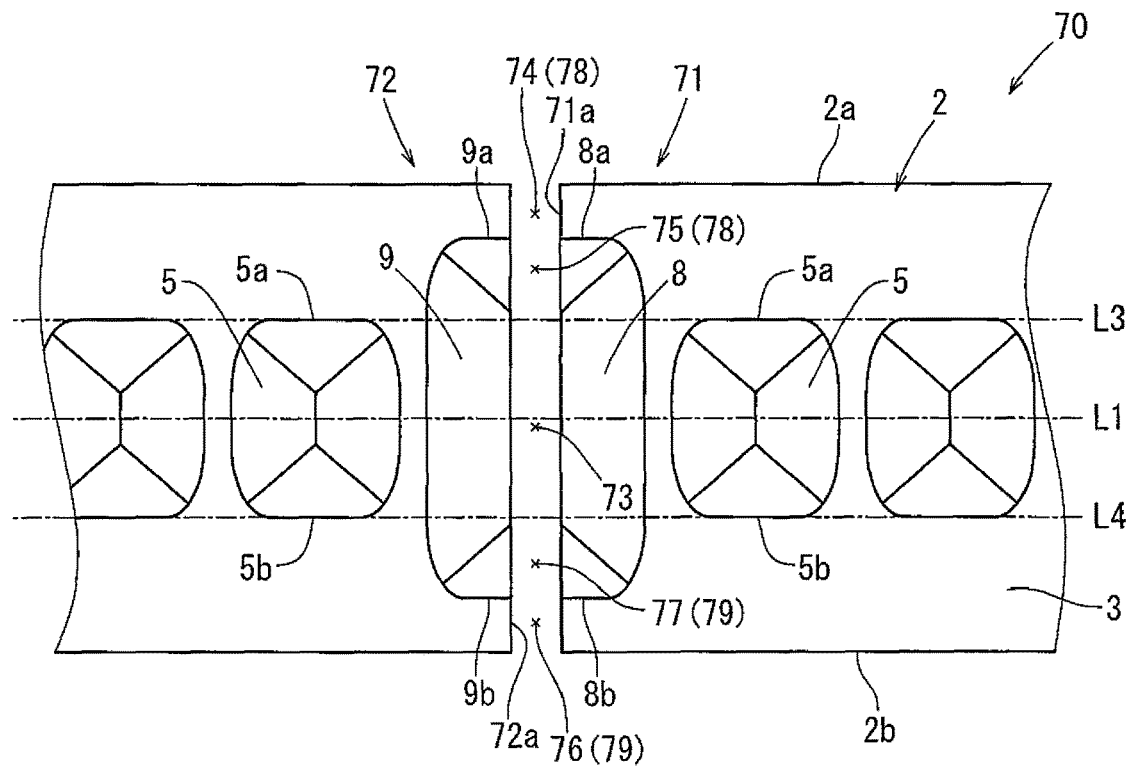
FIG. 11 is a plan view of the tolerance ring around the abutment joint portion of a second reference example.
Figure 12:
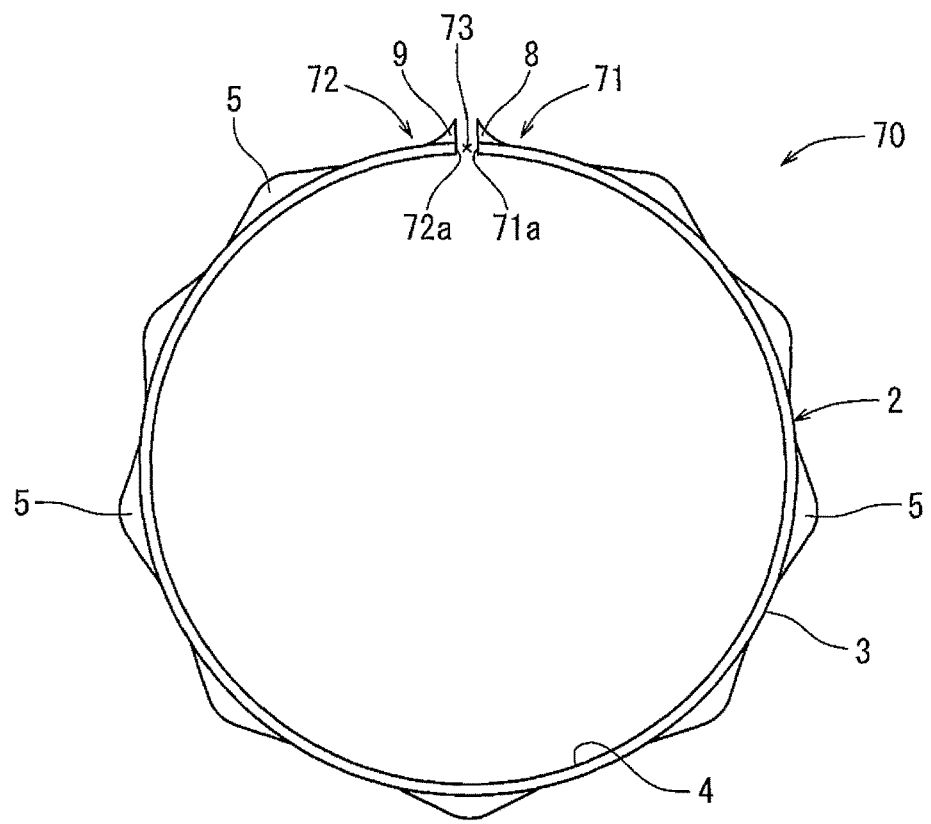
FIG. 12 is a front view of the tolerance ring of FIG. 11 as viewed in the axial direction.

The tolerance ring 70 of the second reference example shown in FIGS. 11, 12 has a first end 71, a second end 72, and insertion restricting portions 78, 79, instead of the first end 11, the second end 12, and the insertion restricting portions 6, 7 of the tolerance ring 1 shown in FIG. 3.

As shown in FIG. 11, the first end 71 and the second end 72 have half-chevron shaped protrusions 8, 9. The first end 71 and the second end 72 also have the insertion restricting portions 78, 79 being aligned in a row at the abutment joint portion 73 in the axial direction.

As shown in FIGS. 11 and 12, each of the half-chevron shaped protrusions 8, 9 has a half-chevron shape in which a radially protruding and axially extending chevron shape is split in half at the circumferential center thereof. The half-chevron shaped protrusions 8, 9 have mutually symmetrical shapes, with the abutment joint portion 73 acting as the center of symmetry. The half-chevron shaped protrusions 8, 9 have a longer axial length than the protrusion 5. The half-chevron shaped protrusions 8, 9 have first axial ends 8a, 9a on the side of the ring body 2 of the first edge 2a and second axial ends 8b, 9b on the side of the ring body 2 of the second edge 2b. The axial positions of the first axial ends 8a, 9a are the same as one another and are located between the first edge 2a of the ring body 2 and the virtual line L3 of the protrusion 5. The axial positions of the second axial ends 8b, 9b are the same as one another and are located between the second edge 2b of the ring body 2 and the virtual line L4 of the protrusion 5.

As shown in FIG. 11, the first end 71 and the second end 72 have end faces 71a, 72a facing each other. The insertion restricting portions 78, 79 have first slits 74, 76 and second slits 75, 77 between the end faces 71a, 72a. Both the first slit 74 and the second slit 75 are located between, in the axial direction, the first edge 2a of the ring body 2 and the virtual line L3 of the protrusion 5. Both the first slit 76 and the second slit 77 are located between, in the axial direction, the second edge 2b of the ring body 2 and the virtual line L4 of the protrusion 5.

As shown in FIG. 11, the first slits 74, 76 and the second slits 75, 77 are aligned in a row in the axial direction of the ring body 2 at the abutment joint portion 73. The first slits 74, 76 are located axially outward of the axial ends of the half-chevron shaped protrusions 8, 9. The second slits 75, 77 are located axially inward of the axial ends of the half-chevron shaped protrusions 8, 9. A radial step is thus provided between each of the first slits 74, 76 and the second slits 75, 77.

As described above, the insertion restricting portions 78, 79 respectively have the half-chevron shaped protrusions 8, 9 protruding radially outward from the ring body 2, as shown in FIGS. 11 and 12. Therefore, for example, when another tolerance ring T attempts to enter the abutment joint portion 73 in the radial direction or in the axial direction, the half-chevron shaped protrusions 8, 9 abut the protrusions and/or the half-chevron shaped protrusions of the other tolerance ring T. This restricts the degree of entry of the other tolerance ring T into the abutment joint portion 73.

Sixth Embodiment

A sixth embodiment will be described with reference to FIG. 13. The tolerance ring 80 shown in FIG. 13 has a first end 81, a second end 82, and insertion restricting portions 88, 89, instead of the first end 11, the second end 12, and the insertion restricting portions 6, 7 shown in FIG. 3. The tolerance ring 80 of FIG. 13 has curved slits 84, 86 instead of the first slits 14, 16 and the second slits 15, 17 shown in FIG. 3. The first end 81 and the second end 82 have end faces 81a, 82a having a configuration similar to that of the end faces 11a, 12a of FIG. 3.

Figure 13:
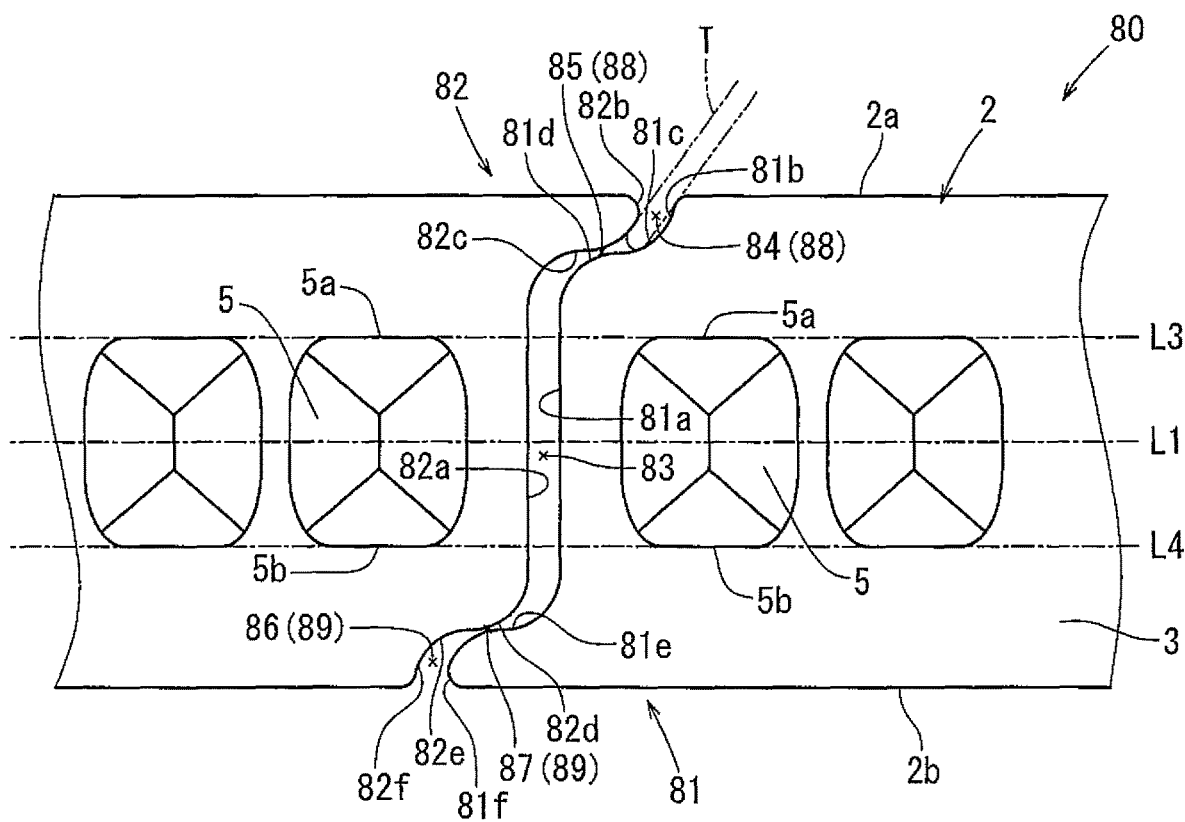
FIG. 13 is a plan view of the tolerance ring around the abutment joint portion according to a sixth embodiment.

As shown in FIG. 13, the insertion restricting portion 88 includes a recessed wall surface 81b meandering in an S shape from the first end 81. The recessed wall surface 81b is configured to connect the first edge 2a of the ring body 2 and the end face 81a. The recessed wall surface 81b includes a first curved section 81c and a second curved section 81d. The first curved section 81c has a cutout shape in which the first end 81 is cut out in the circumferential direction (to the right in FIG. 13) in substantially an arc shape. The second curved section 81d has an overhanging shape projecting from the recessed wall surface 81b in the circumferential direction (to the left in FIG. 13) in substantially an arc shape.

As shown in FIG. 13, the insertion restricting portion 88 has a first projecting wall surface 82b and a second projecting wall surface 82c at the second end 82. The first projecting wall surface 82b extends from the first edge 2a of the ring body 2 and along the recessed wall surface 81b. The second projecting wall surface 82c continuously extends from the first projecting wall surface 82b and connects the first projecting wall surface 82b and the end face 82a The first projecting wall surface 82b and the second projecting wall surface 82c cooperate with each other to form an S shape. The first projecting wall surface 82b faces the first curved section 81c, while the second projecting wall surface 82c faces the second curved section 81d.

As shown in FIG. 13, the insertion restricting portion 88 has an S-shaped slit 84 between the recessed wall surface 81b, the first projecting wall surface 82b, and the second projecting wall surface 82c. The slit 84 has a narrow slit part 85 between the second curved section 81d and the second projecting wall surface 82c. The narrow slit part 85 extends in a direction intersecting with the opening direction of the slit 84 on the side of the first edge 2a of the ring body 2a. The narrow slit part 85 intersects the slit 84 at an angle (for example, about 90°). The slit 84 is wider than the plate thickness of the ring body 2, while the narrow slit part 85 is narrower than the plate thickness of the ring body 2. The slit 84, the first curved section 81c, and the narrow slit part 85 are all located between the first edge 2a of the ring body 2 and the virtual line L3 of the protrusion 5.

As shown in FIG. 13, the insertion restricting portion 89 is point-symmetric to the insertion restricting portion 88, with the center of the abutment joint portion 83 acting as the center of symmetry. The insertion restricting portion 89 has a slit 86 and a narrow slit part 87 similar to the other insertion restricting portion 88. The slit 86 is formed in an S shape between a recessed wall surface 82*f*, a first projecting wall surface 81*f*, and a second projecting wall surface 81*e*. The narrow slit part 87 is defined between a second curved section 82*d* and a second projecting wall surface 81*e*. The slit 86, the first curved section 82*e*, and the narrow slit part 87 are provided between the second edge 2*b* of the ring body 2 and the virtual line L4 of the protrusion 5.

As described above, the insertion restricting portions 88, 89 have slits 84, 86 extending in an S-shape from the first edge 2*a* and the second edge 2*b*, respectively. The slits 84, 86 have cutout-shaped first curved sections 81*c*, 82*e*. One first curved section 81*c* is located in an area between, in the axial direction, the virtual line L3 of the protrusion 5 and the first edge 2*a* of the ring body 2. The other first curved section 82*e* is located in an area between, in the axial direction, the virtual line L4 of the protrusion 5 and the second edge 2*b* of the ring body 2.

Therefore, the ring body of another tolerance ring T abuts the side wall surface (bottom end face) of the first curved sections 81*c*, 82*e* when axially entering the slits 84, 86. As a result, further entry of the other tolerance ring T in the axially inward direction is restricted by the first curved sections 81*c*, 82*e*. Thus, the degree of entanglement between the tolerance rings can be restricted.

Various modifications may be made to the tolerance rings 1, 20, 40, 50, 60, 80 of the first to sixth embodiments described above. For example, these tolerance rings may have insertion restricting portions on both the first edge 2*a* side and the second edge 2*b* side. Alternatively, the tolerance ring may have the insertion restricting portion only on one of the first edge 2*a* side or the second edge 2*b*. The two insertion restricting portions in FIGS. 3, 7, 8 and 13 are point-symmetric with respect to the center of the abutment joint portion acting as the center of symmetry. Alternatively, the two insertion restricting portions may be, for example, line-symmetric with the center line L1 acting as the center of symmetry. Alternatively, the two insertion restricting portions may be asymmetric to each other. In the tolerance rings of FIGS. 4 and 6, the two insertion restricting portions are line-symmetric with the center line L1 acting as the center of symmetry. Alternatively, the two insertion restricting portions may be, for example, point-symmetric to each other with the center of the abutment joint portion acting as the center of symmetry. Alternatively, the two insertion restricting portions may be asymmetric to each other.

Either the insertion restricting portion on the first edge 2*a* side or the insertion restricting portion on the second edge 2*b* side may be replaced with the insertion restricting portion from another embodiment. For example, the insertion restricting portion 6 shown in FIG. 3 may be adopted as the insertion restricting portion on the side of the first edge 2*a*, and the insertion restricting portion 29 shown in FIG. 4 may be adopted as the insertion restricting portion on the side of the second edge 2*b*. The insertion restricting portions in FIGS. 5 and 9 may be adopted as an insertion restricting portion on the side of the first edge 2*a* or an insertion restricting portion on the side of the second edge 2*b*. Instead of the axial protrusions 51*d*, 52*d* shown in FIG. 7, for example, may be provided such that they both project axially inward from the second projecting wall surfaces 52*c*, 51*e*.

As shown in FIG. 2, the plurality of protrusions 5 are aligned in a line along the center line L1 at substantially the center of the ring body 2 in the axial direction. Alternatively, the plurality of protrusions may be aligned in a line in the circumferential direction of the ring body 2 at positions deviated from the center line L1, for instance toward the side of the first edge 2*a*. As shown in FIG. 2, each protrusion 5 has a first axial end 5*a* aligned on a virtual line L3 and a second axial end 5*b* aligned on a virtual line L4. Alternatively, the tolerance ring may have a variety of types of protrusions having different axial lengths. The plurality of protrusions may be arranged distributed in a zigzag manner in the axial direction of the ring body 2. In this case, the insertion restricting portion is formed between the axial end and the edge of the protrusion that is closest to the edge of the ring body 2 in the axial direction.

Figure 14:
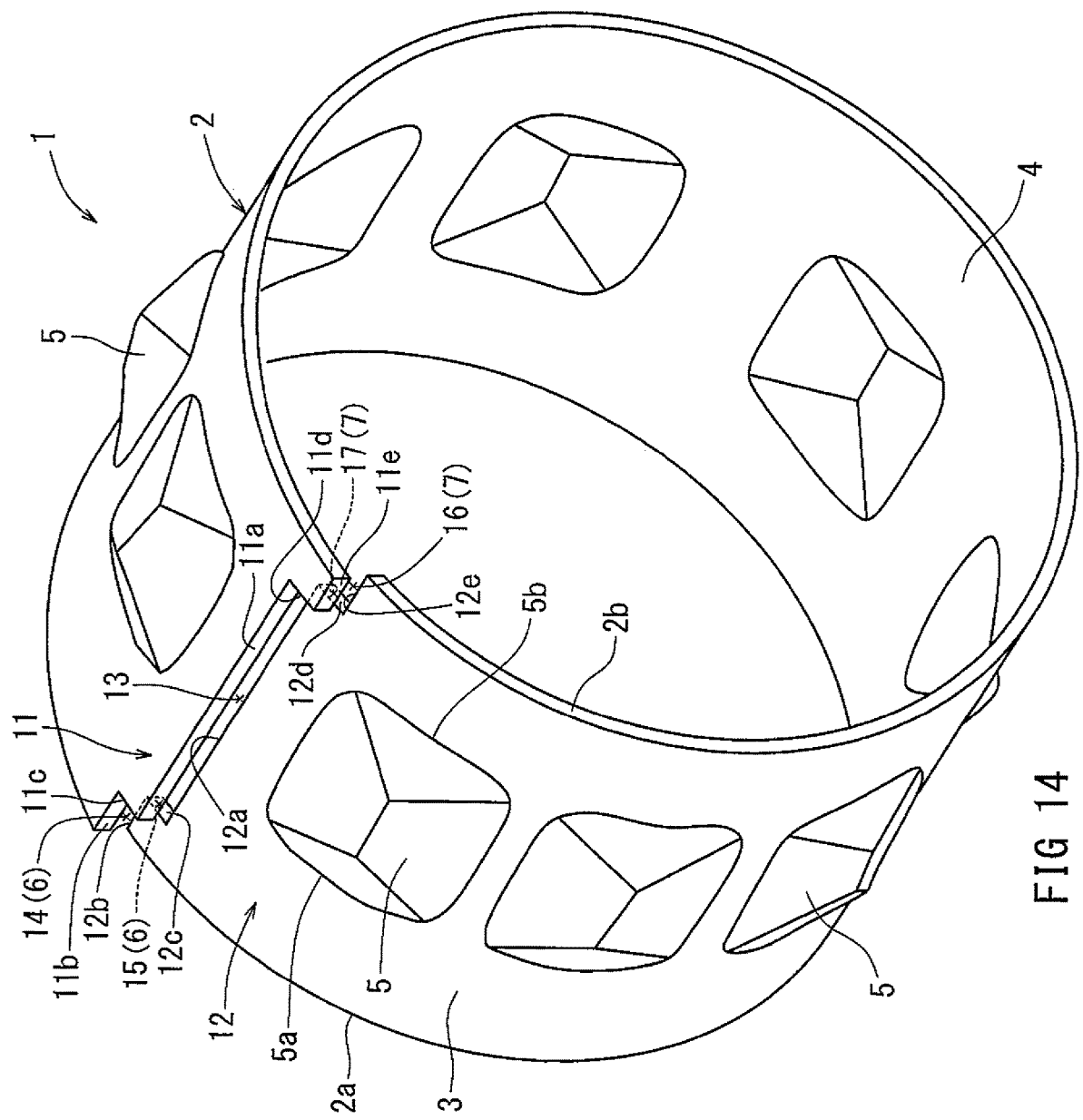
FIG. 14 is a perspective view of a variation of the tolerance ring according to the first embodiment.

The tolerance ring 1 of the embodiment of FIG. 1 has a first end 11 and a second end 12 that face each other at the abutment joint portion 13. The first end 11 and the second end 12 of FIG. 1 are arranged so as not to overlap in the radial direction in a free state. Alternatively, the tolerance ring 1 may have a first end 11 and a second end 12 that overlap in the radial direction in the free state, as shown in FIG. 14. In other words, the first end 11 shown in FIG. 1 is axially and radially displaced from the second end 12 such that the tolerance ring 1 shown in FIG. 14 is formed.

More specifically, as shown in FIG. 14, the first end 11 is displaced in one axial direction (to the left in FIG. 14) and radially outward with respect to the second end 12. As a result, the overhanging portion located between the end face 11*a* and the second recessed wall surface 11*c* radially overlaps the overhanging portion formed by the first projecting wall surface 12*b* and the second projecting wall surface 12*c*. The overhanging portion formed by the first projecting wall surface lie and the second projecting wall surface 11*d* radially overlaps the overhanging portion located between the end face 12*a* and the second recessed wall surface 12*d*. The first slits 14, 16 define a predetermined space between the first end 11 and the second end 12 in the circumferential direction and the radial direction. Although the second slits 15, 17 define a predetermined space in the radial direction between the first end 11 and the second end 12, they overlap in the axial direction. In this configuration as well, another tolerance ring T that axially enters the first slits 14, 16 abuts the second recessed wall surfaces 11*c*, 12*d*, such that the entry into the second slits 15, 17 is restricted. As a result, the degree of entry of the other tolerance ring T into the abutment joint portion 13 can be restricted.

The present disclosure also includes the following structure. More specifically, the tolerance ring has a ring body and a plurality of protrusions. The ring body is formed in a ring shape from a strip plate material having a spring property. The protrusion is formed on the ring body and projects radially from the ring body. An abutment joint portion is formed between the circumferential first end and the second end of the ring body. The ring body has an axial first edge and an axial second edge. The tolerance ring has an insertion restricting portion configured to restrict the amount of axial entry if another tolerance ring is attempting to be inserted in the abutment joint portion from the side of the first edge. The insertion restricting portion has a first slit and a second slit. The first slit extends from the first edge of the ring body and between the first end and the second end of the ring body. The second slit intersects the first slit at an angle and extends from the first slit. The insertion restricting portion has a cutout that extends in the extending direction of the first slit. The cutout extends from the first slit at a position beyond the connection point between the first slit and the second slit. Therefore, the ring body of the other tolerance ring that is axially entering along the first slit enters from the first slit toward the cutout. This can restrict the other tolerance ring from entering the second slit from the first slit. The degree of entanglement between the tolerance rings can thus be reliably restricted.

Various embodiments described in detail with reference to the accompanying drawings are representative examples of the present invention and thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved tolerance ring and/or methods of making and using the same.

The invention claimed is:

1. A tolerance ring, comprising:
    a ring-shaped ring body formed of a strip plate material having a spring property,
    the ring body having an abutment joint portion defined between a first end and a second end of the ring body in a circumferential direction;
    a plurality of protrusions formed on the ring body and projecting radially from the ring body;
    a first edge and a second edge of the ring body in an axial direction of the ring body; and
    an insertion restricting portion disposed within the abutment joint portion configured to restrict an entering amount of another tolerance ring in the axial direction when the other tolerance ring is being inserted into the abutment joint portion from the side of the first edge, wherein:
    the insertion restricting portion is located such that the entering amount of the other tolerance ring is restricted in an area between, in the axial direction, an axial end of the plurality of the protrusions on a side of the first edge and the first edge,
    the insertion restricting portion includes a first slit extending from the first edge of the ring body toward the second edge, extending between the first end and the second end, and formed by corresponding parallel end surfaces of the first and second ends,
    the insertion restricting portion includes a second slit extending from the first slit at an angle relative to the first slit toward the second edge of the ring body, extending between the first end and the second end, and formed by corresponding parallel end surfaces of the first and second ends,
    the second slit is apart from the first edge and is located nearer the second edge as compared to the first slit from the second edge,
    a connection point between the first slit and the second slit is located in the area therebetween, in the axial direction, the axial end of the first edge of the plurality of the protrusions on the side of the first edge and the first edge, and
    the insertion restricting portion includes a cutout formed within a respective one of the first and second ends of the ring body, the cutout being colinear with the first slit and extending in an extending direction of the first slit beyond the connection point of the first slit and the second slit toward the second edge of the ring body, and having peripheral edge surfaces corresponding to the end surfaces of the respective first or second end defining the first slit.

2. The tolerance ring as defined in claim 1, wherein the first slit has a width wider than a plate thickness of the ring body.

* * * * *